United States Patent
Mortimer

[19]

[11] Patent Number: 6,089,678
[45] Date of Patent: Jul. 18, 2000

[54] HYDRAULIC BRAKING SYSTEMS FOR VEHICLES

[75] Inventor: Ivan Mortimer, West Midlands, United Kingdom

[73] Assignee: Lucas Industries Public Limited Company, West Midlands, United Kingdom

[21] Appl. No.: 08/809,846

[22] PCT Filed: Oct. 4, 1995

[86] PCT No.: PCT/GB95/02355

§ 371 Date: May 16, 1997

§ 102(e) Date: May 16, 1997

[87] PCT Pub. No.: WO96/11129

PCT Pub. Date: Apr. 18, 1996

[30] Foreign Application Priority Data

| Oct. 6, 1994 | [GB] | United Kingdom | 9420149 |
| Jun. 5, 1995 | [GB] | United Kingdom | 9511305 |

[51] Int. Cl.[7] ........................................... B60T 8/34
[52] U.S. Cl. ............... 303/113.4; 303/10; 303/113.1; 303/114.1; 303/116.1; 303/116.2; 303/DIG. 2; 303/DIG. 4
[58] Field of Search .................. 303/10, 113.1, 303/113.4, 114.1, 116.1, 116.2, DIG. 2, DIG. 4

[56] References Cited

U.S. PATENT DOCUMENTS

| 4,662,687 | 5/1987 | Leiber | 303/110 |
| 4,812,777 | 3/1989 | Shirai | 303/14 |
| 4,919,493 | 4/1990 | Leiber | 303/15 |
| 5,567,021 | 10/1996 | Gaillard | 303/3 |
| 5,709,438 | 1/1998 | Isakson et al. | 303/113.4 |
| 5,921,640 | 7/1999 | Mortimer et al. | 303/125 |

*Primary Examiner*—Chris Schwartz
*Attorney, Agent, or Firm*—Laff, Whitesel & Saret, Ltd.; J. Warren Whitesel

[57] ABSTRACT

In a hydraulic braking system, during normal service braking, the output from a master cylinder (3) is disabled and a brake (12) is applied from a high pressure hydraulic source (24) under the control of electric control means (30) including a solenoid operated actuator (6) responsive to electrical signals from a transducer (2) associated with the pedal (1), and upon failure of the electrical control means a direct flow path is defined between the master cylinder (3) and the brake (12) and through which the brake can be applied from the master cylinder by movement of the pedal in the "push through" mode.

10 Claims, 7 Drawing Sheets

HYDRAULIC BRAKING SYSTEMS FOR VEHICLES

This invention relates to hydraulic braking systems for vehicles of the kind in which an electrical signal from a pedal-responsive transducer is utilised in an electric control circuit to operate a solenoid-operated actuator for normal service braking, and upon failure of the electric control circuit a master cylinder can be operated by the pedal in a mode known as "push through" to apply an operating pressure to the brake.

BACKGROUND OF THE INVENTION

A braking system of the kind set forth is disclosed in WO-A-93/00236. In this system the pedal-operated master cylinder communicates with a brake through a pilot pressure operated isolation valve which is spring urged into an open position, and the output from an hydraulic pump is communicated to the isolation valve. When the pressure generated by the pump in response to an electric signal from an electrical sensor associated with the pedal is greater than the force needed to overcome the spring force of the isolation valve, the valve switches to communicate the pump directly to the brake, and isolates the master cylinder from the brake. After the isolation valve changes state the master cylinder is not used to pressurise the brake. However, in the event of malfunction of the electro-hydraulic portion of the system the brake can be applied directly from the master cylinder through the isolation valve in the "push through" mode with the valve switching to its original state.

SUMMARY OF THE INVENTION

We are also aware of GB-A2-0 357 922. This application discloses a procedure for operation of an electrical pressure medium service brake system. The procedure proposed involves performing integrity checks in order to determine the correct operation of various sensors in the system by comparing various outputs from the sensors. If the outputs from the sensors do not correspond to each other in an expected manner it is assumed that a sensor must be at fault. However, a problem with this procedure is that if a fault occurs in the integrity of a brake line, an incorrect diagnosis that it was a sensor fault may occur.

According to our invention in an hydraulic braking system of the kind set forth for vehicles, an electrical signal from the pedal responsive transducer is adapted to be compared with an electrical signal from a pressure sensor responsive to output pressure from the master cylinder in order to check the integrity of a direct flow path through which the brake can be applied from the master cylinder by movement of the pedal in the "push through" mode.

This has the advantage that malfunctions such as blockages or leaks in at least the direct flow path may be detected. On detection of the leak or blockage the driver may be alerted and a repair effected. This may aid in the prevention of problems associated with faults in the brake circuit.

Preferably the pedal responsive transducer is adapted to monitor the displacement of the brake pedal and the pressure sensor is adapted to monitor the pressure in the direct flow path.

Preferably the output from the master cylinder is disabled and the brake is applied from a high pressure hydraulic source under the control of electrical control means including a solenoid operated actuator responsive to electric signals from the transducer associated with the pedal, and upon failure of the electrical control means the brake can be applied through the direct flow path.

This has the advantage that pressure fluid from the master cylinder is utilised in the application of the brake upon failure of the electrical control means. For normal service braking the operating fluid is supplied from the hydraulic source to the brake.

During a first part of the travel of the pedal fluid from the master cylinder may fill the brakes in the manner of a conventional "quick-fill" master cylinder to provided "pedal feel" and during a second continuous part of the travel the fluid may be pressurised to apply the brakes. However, such a "quick fill" master cylinder is an optional feature of the invention.

Since the hydraulic actuator is normally spring-urged into an open position and cycled on each and every occasion that the brake is applied from the high pressure source under the control of the electrical control means, upon failure of the electrical control means the actuator is automatically restored to its original open position by the spring to establish free communication between the master cylinder and the brake thereby providing the direct flow path.

Preferably the integrity of the braking system is assessed on every application of the brake. This may allow the detection of a fault as soon as it has occurred.

Preferably the signal from the pedal responsive transducer is compared with the signal from the pressure sensor by the electrical control means. An advantage of this is that the electrical control means which has been provided for other functions is used. Thus the amount of components may be reduced.

The integrity of only part of the direct flow path may be checked.

At least the brakes on the front wheels of the vehicle are adapted to be operated by a "push through" upon failure of the electronic control means, either generally or locally although, in certain systems, the brakes on all four wheels can be operated in this manner either individually, for example upon failure of a respective solenoid-operated actuator, or simultaneously, upon failure of a part of the electrical control means controlling operation of all the brakes simultaneously.

The high pressure source may comprise an hydraulic pump which can also be used to provide re-application pressure for anti-lock "ABS" control of a wheel approaching a skid condition and/or Traction Control of a driven spinning wheel.

BRIEF DESCRIPTION OF DRAWINGS

Some embodiments of our invention are illustrated in the accompanying drawings in which.

DETAILED DESCRIPTION OF THE INVENTION

Figure 1:
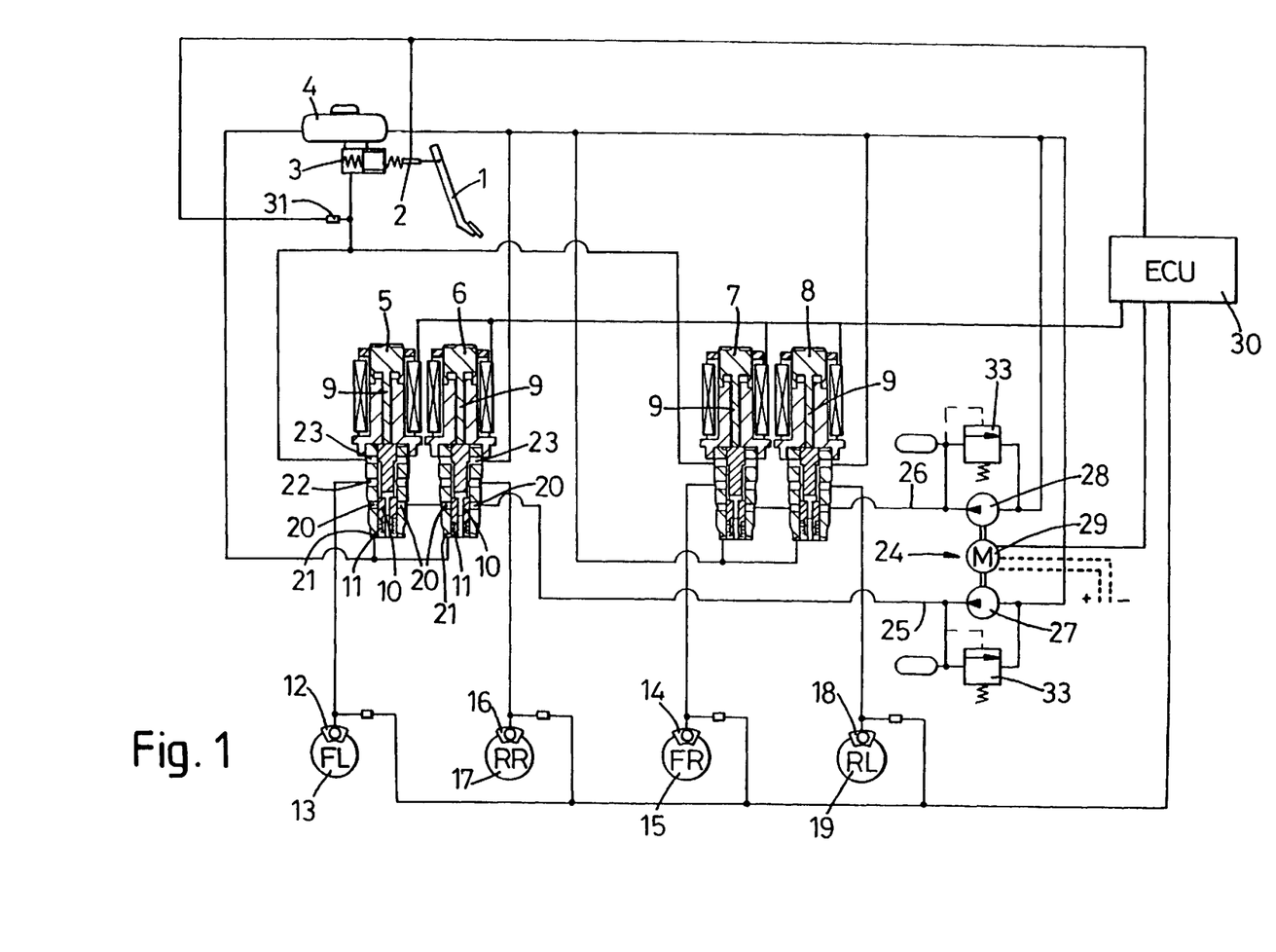
FIG. 1 is a layout of a braking system of the 'X' split type with push through provided for the brakes on the front wheels.

In the braking system illustrated in the layout of FIG. 1 a pedal 1 is adapted to act on a travel transducer 2 to initiate operation of the system for normal service braking with the pedal movable through a first range. The travel transducers 2 may be replaced with a force sensor. Upon failure of a portion of the system during normal service braking the pedal 1 is movable through a further distance in order to operate an hydraulic master cylinder 3 having a hydrostatic supply of fluid housed in a reservoir 4. Four solenoid-operated hydraulic actuators 5, 6, 7 and 8 each including a solenoid-operated armature 9 adapted to move a spool 10 axially in a bore against the loading in a return spring 11 is adapted to control the application of brake applying pressure to the brakes of the vehicle. Specifically the actuator 5 controls the supply of fluid to a brake 12 on the front left driven wheel 13 of the vehicle, the actuator 7 controls the supply of brake applying fluid to a brake 14 on the front right driven wheel 15 of the vehicle, the actuator 6 controls the supply of fluid to a brake 16 on the right rear wheel 17 of the vehicle, and the actuator 8 controls the supply of fluid to the brake 18 on the rear left wheel 19 of the vehicle. The actuators 5 and 6 are connected in one pair, and the actuator 7 and 8 are connected in a second pair in order to achieve connections between the brake on each front wheel and on the diagonally opposite rear wheel.

Each spool 10 controls communication between an inlet port 20 an outlet port 22, and a second inlet port 23 adjacent to the armature. Vent ports 21 and the inlet ports 23 are all connected to the reservoir 4 through unrestricted pipe lines. The outlet ports 22 are each connected to a respective brake, and each inlet port 20 is connected to a supply 24 of high pressure fluid through separate lines 25 and 26, of which the line 25 is connected to the actuators 5 and 6 and the line 26 is connected to the actuators 7 and 8. The vent port 21 ensures that a lower face of the spool valve remains at atmospheric pressure and also returns any parasitic fluid leakage, from the high pressure supply, which has occurred across the spool valve, to the master cylinder.

The supply of high pressure fluid comprises a pair of hydraulic pumps 27 and 28 of which the pump 27 is connected to the supply line 25 and the pump 28 is connected to the supply line 26. Both pumps are fed with fluid from the reservoir 4. Both pumps are also driven by a common electrically-driven motor 29. An hydraulic accumulator system 33 is connected in parallel with each of the two pumps 27, 28.

An electronic control unit 30 receives electrical signals from the travel transducer 2, from a pressure sensor 31 sensing pressure in the line between the master cylinder 3 and the second inlet port 23 of the hydraulic actuators 5 and 7 only since the ports 2 of the hydraulic actuators 6 and 8 are connected to the reservoir 4.

The electronic control unit produces signals for energising the motor and the solenoid-operated hydraulic actuators 5, 6, 7 and 8 in accordance with the required driver/vehicle demands.

In a normal brakes-off position the spools 10 of the actuators 5, 6, 7 and 8 are retracted so that the brakes are in open communication with the reservoir 4 through the second inlet port 23 and the outlet port 22, and with the second inlet ports 23 of the actuators 5 and 7 being connected to the reservoir 4 indirectly through the master cylinder 3.

The system is operated for normal service braking by movement of the pedal, which acts on the travel transducer 2, and in response to a signal from the transducer 2 the electronic control unit operates the motor 29 to drive the pumps 27 and 28, in order to maintain sufficient pressure in the supply circuit and actuates the four hydraulic actuators 5, 6, 7 and 8 simultaneously with the spools closing the second inlet port 23 and establishing communication between the inlet ports 20 and the brakes, via outlet ports 22, with the pressure applied to the brakes being regulated by the actuators.

The pressure in the actuators 5, 6, 7 and 8 increases as pressurised fluid enters via port 20, the force developed over the spool cross sectional area also increases. Eventually the force developed across the spool will equal the force applied by the solenoid armature. At this time, or just thereafter, the spool 10 will move slightly upwards, isolating inlet port 20 from outlet port 22.

Any increase in braking demand will cause the force applied by the solenoid to increase and cause the spool 10 to move downwards, reconnecting ports 20 and 22. Pressurised fluid from the inlet port 20 will then be able to flow to the brakes via outlet port 22, until equilibrium is re-established.

A decrease in braking demand results in a decrease in the downward force applied by the armature, allowing the spool 10 to move upwards. Such upward movement will reconnect the outlet port 22 and the second inlet port 23. Since the pressure in the line between the master cylinder 3 and the port 23 is always lower than the pressure in the brakes, once ports 22 and 23 are connected pressure will be released from the brakes to the master cylinder. Once enough pressure has been released the force developed across the spool valve will once again equal the force applied by the solenoid and the spool 10 will move to its equilibrium position, isolating the port 22 from both of ports 23 and 20.

Upon failure of the electrical control circuit the hydraulic actuators are biassed by the springs 10 to return to their initial positions and further movement of the pedal in a brake applying direction is adapted to operate the master cylinder 3 in a "push through" mode in order to operate the brakes 12 and 14 on the front wheels 13 and 15 through the second inlet ports 23 and the supply ports 22. The actuators 6 and 8 remain inoperative since the second inlet ports 23 of those actuators is at all times connected to the reservoir 4.

During a first part of the travel of the pedal 1 fluid from the master cylinder 3 fills the brakes in the manner of a conventional "quick-fill" master cylinder to provide "pedal feel" and during a second subsequent continuous part of the travel the fluid is pressurised to apply the brakes.

Should one of the hydraulic actuators 5 or 7 fail then that actuator automatically returns to its initial, inoperative position, assumed in an "brakes-off" position and the brake controlled by that actuator is automatically applied directly from the master cylinder in a "push through" mode as described above.

Also, on each cycle of brake application, the electronic control unit evaluates the integrity of certain parts of the brake system.

As the driver de-presses the brake pedal 1, the travel transducer 2 senses the movement of the pedal 1 and the electronic control unit correspondingly actuates the spool valve. The second inlet port 23 is isolated by the movement of the spool valve. A closed line exists between the master cylinder 3 and the spool valve. A pressure exists in the closed line due to movement of the brake pedal 1. The pressure generated should be proportional to the pedal displacement. The pressure sensor 31 measures the pressure in the closed line.

The electronic control unit monitors the pedal's 1 movement by monitoring the travel transducer 2 and can check that the correct pressure is generated in the line by monitoring the pressure sensor 31. If a leak or blockage were to occur in the closed line then the pressure measured would be incorrect. The pressure measured would either be too high, if a blockage was present, or too low, if a leak were present, plus a tolerance. A likely place for leaks to occur is the second inlet port 23.

The electronic control unit may check the pressure by either using a comparator or a look up table method. If a comparator were used it would check that the pressure was within a prescribed range when the pedal was depressed by a certain amount. A look up table would allow the pressure to be checked against the pedal displacement, more than one pedal displacement, or even continuously.

Figure 7:
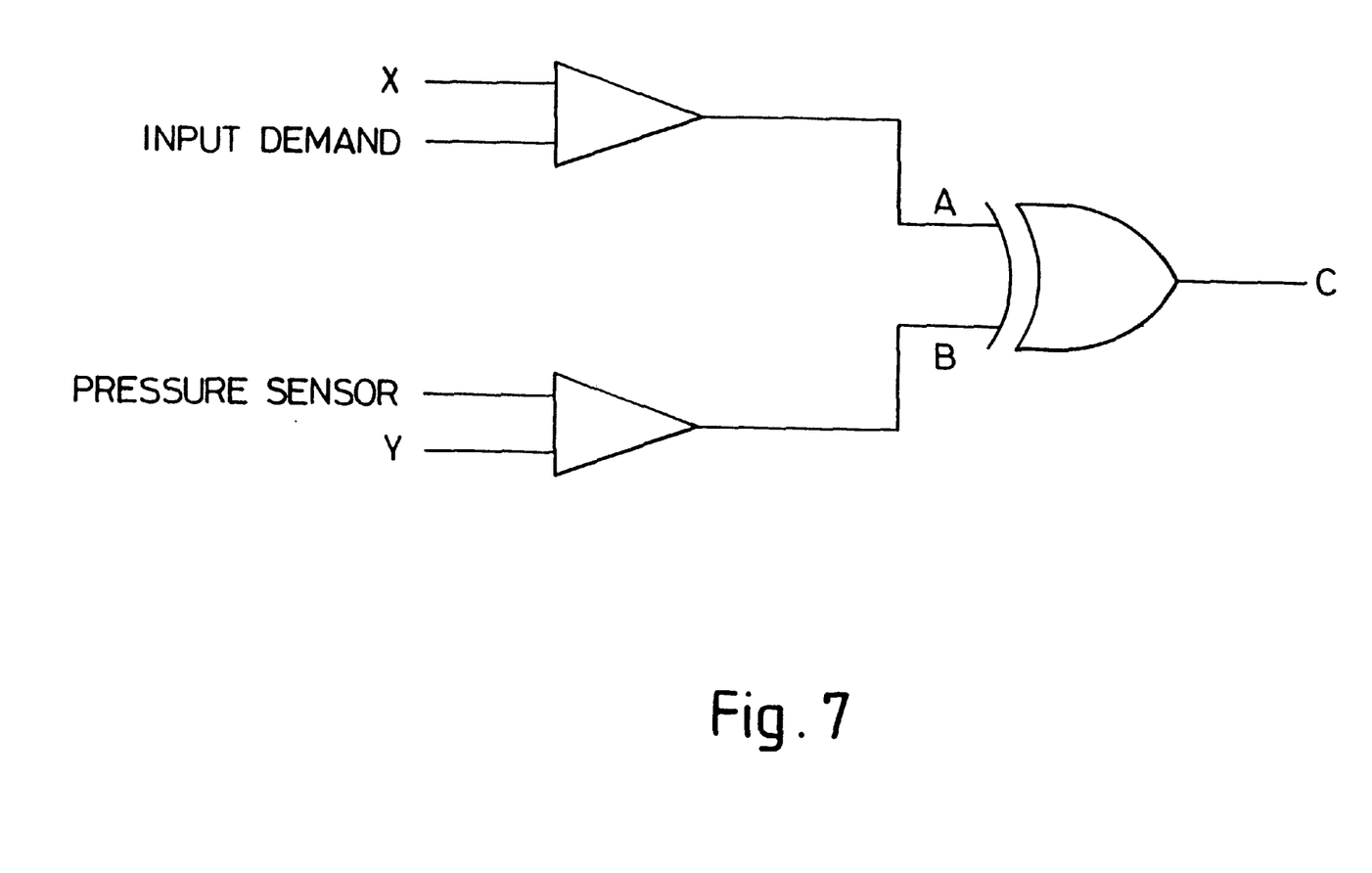
FIG. 7 is a schematic of a circuit which can be used to assess the condition of the brake circuit.

FIG. 7 shows a schematic of a circuit which may be used to implement the comparison method. The circuit could of course be realised virtually in software.

The output from the travel transducer 2 is connected to the input of the comparator labelled "input demand". The second input of the comparator labelled "X" is connected to a reference. Therefore, as appreciated by a person skilled in the art, as the pedal is depressed to a predetermined position, the signal at the "input demand" input will equal the value corresponding to the reference. The output of the comparator will go high. The output will remain high as long as the signal at the "input demand" input is greater than or equal to the reference.

Similarly the output of the pressure sensor is connected to a first input of the second comparator. A second input of the second comparator is connected to a reference Y. The reference Y corresponds to the signal level corresponding to the pressure that should be present in the closed line at the predetermined pedal position. When the signal from the pressure sensor equals the reference Y the output from the second comparator will go high. The output will remain high as long as the signal at first input is above or equal to the reference Y.

Under normal operating conditions the outputs of the two comparators should go high at the same time. That is pressure in the line should be at a known value when the pedal is at the predetermined position. Therefore in normal operation the output of the Exclusive-OR gate will always be low. Its inputs, A and B, both should always either be low or high.

However, should there be a malfunction, an input to the Exclusive OR gate, either A or B, may go high on its own. This would indicate that the pressure wasn't as expected. The output of the Exclusive-OR gate would therefore go high indicating a fault.

It will be appreciated that certain tolerances will be designed into the circuit described herein before to allow for tolerances in the hydraulic system. Such tolerances in the circuit will ensure that the output C does not toggle as the comparators switch, i.e. if one comparator switches momentarily before the other.

Figure 2:
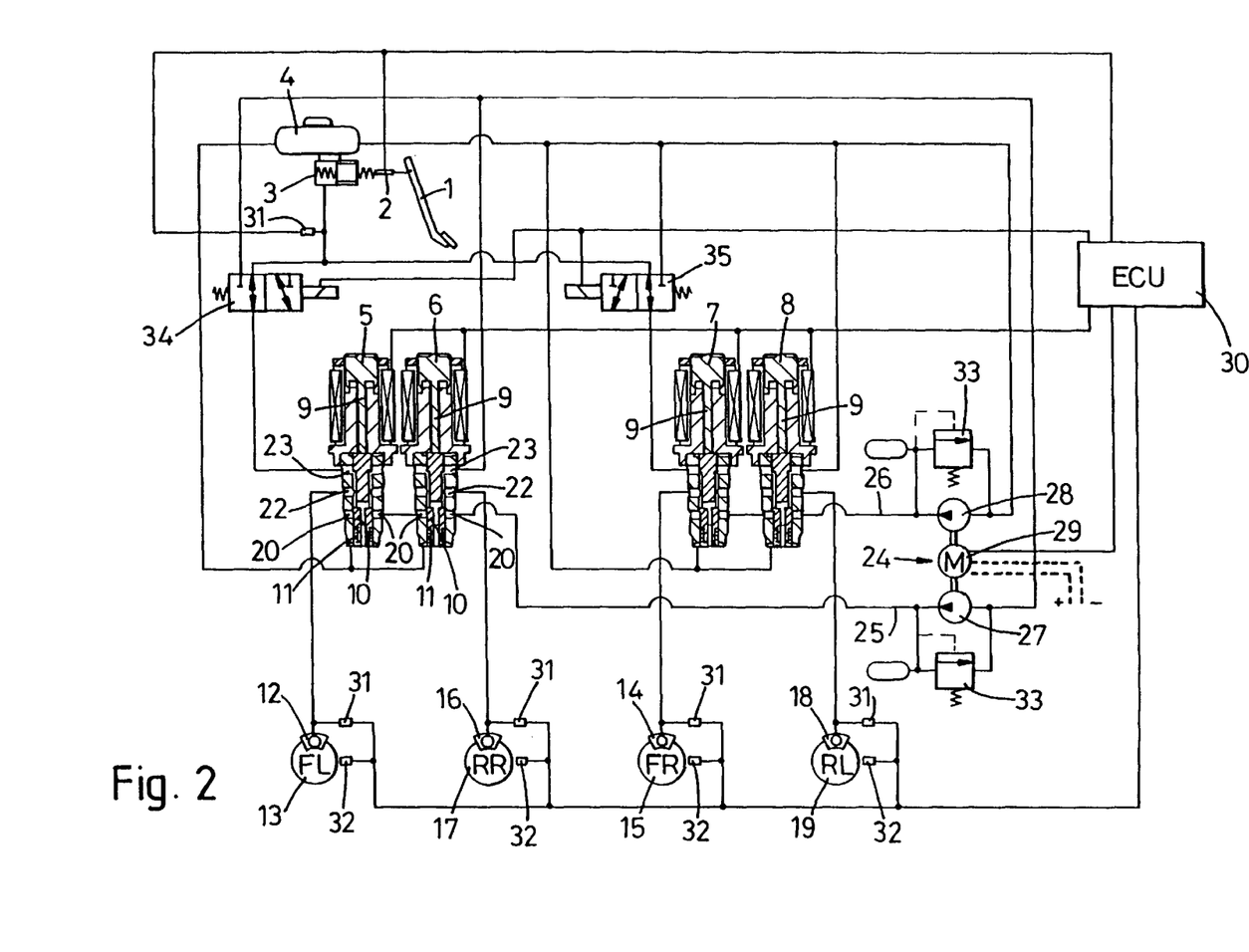
FIG. 2 is a layout of a braking system similar to FIG. 1 but including ABS and Traction Control.

The braking system illustrated in the layout of FIG. 2 is similar to that of FIG. 1 except that it is adapted to perform ABS and Traction Control. Specifically each wheel is provided with a brake pressure sensor 51 and a wheel speed sensor 32. Electronic control valves 34 and 35 are provided in the lines between the second inlet ports of the actuators 5 and 7 and the master cylinder 3 to provide communication between that line and the reservoir 4.

The control valves 34 and 35 of FIGS. 2 to 6 are a likely place for the circuit to leak, but which would be detected by the technique described herein before.

During normal service brake operation the solenoid-operated valves 34 and 35 are in the open positions as shown so that the system functions in a similar manner to the system described above with reference to FIG. 1.

During brake operation, should one of the speed sensors detect the approach of an incipient wheel speed condition, then the electronic control unit is adapted to operate as follows. Assuming that the condition occurs on the wheel 17 the solenoid-operated valves 34 and 35 switch to the operation position shown and the electronic control unit 30 operates the actuators 6 to isolate the brake 16 from the supply 27 and release the fluid from the brake to the reservoir 4. When the electronic control unit 30 senses that the wheel has recovered the hydraulic actuator 6 operates again to isolate the brake from the reservoir and permit the brake to be applied under the control of the actuator 6.

If, on the other hand, a front wheel, say the front wheel 13, approaches an incipient wheel speed condition, not only is the hydraulic actuator 5 operated to isolate the brake 12 from the pump, but the solenoid-operated valve 34 is also operated to place the second inlet port 23 in communication with the reservoir 4 to enable fluid from the brake to be dumped.

In a "brakes off" condition, should the electronic control unit 30 detect spinning of a driven front wheel, say the wheel 13 operates the pump 27 and the solenoid-operated hydraulic actuator 5 to apply the brake 12 on the wheel thereby achieving Traction Control. The accumulator system 33 will also be operated to maintain the required hydraulic supply.

The braking system illustrated in the layout of FIG. 2 is otherwise the same as FIG. 1 and corresponding references have been applied to corresponding parts.

Figure 3:
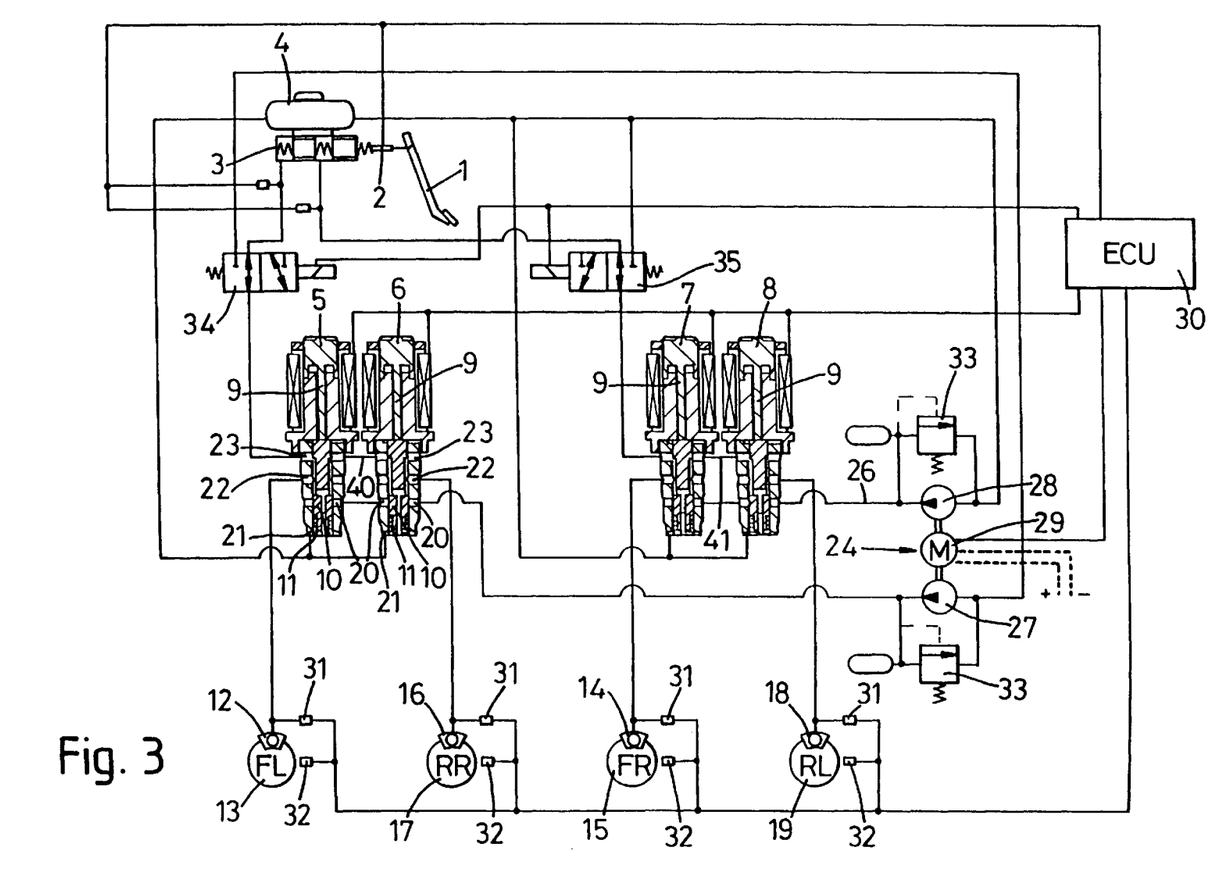
FIG. 3 is a layout of a braking system similar to FIG. 2 but with push through provided for the brakes on all four wheels.

The braking system shown in the layout of FIG. 3 is similar to FIG. 2 except that the system has been modified in order to provide "push through" for the brakes on the rear wheels 17 and 19, in addition to the brake on the front wheels 13, 15. This is achieved by connecting together the second inlet ports 23 of the actuators 5 and 6 by a connection 40, and connecting together the second inlet ports 23 of the actuators 7 and 8 through a connection 41. The two connections 40 and 41 replace the connection to the reservoir 4 which are omitted.

By means of this modification hydraulic pressure generated in the master cylinder 3 can be supplied to any one of the wheel brakes for push through under the control of the respective actuator.

Figure 4:
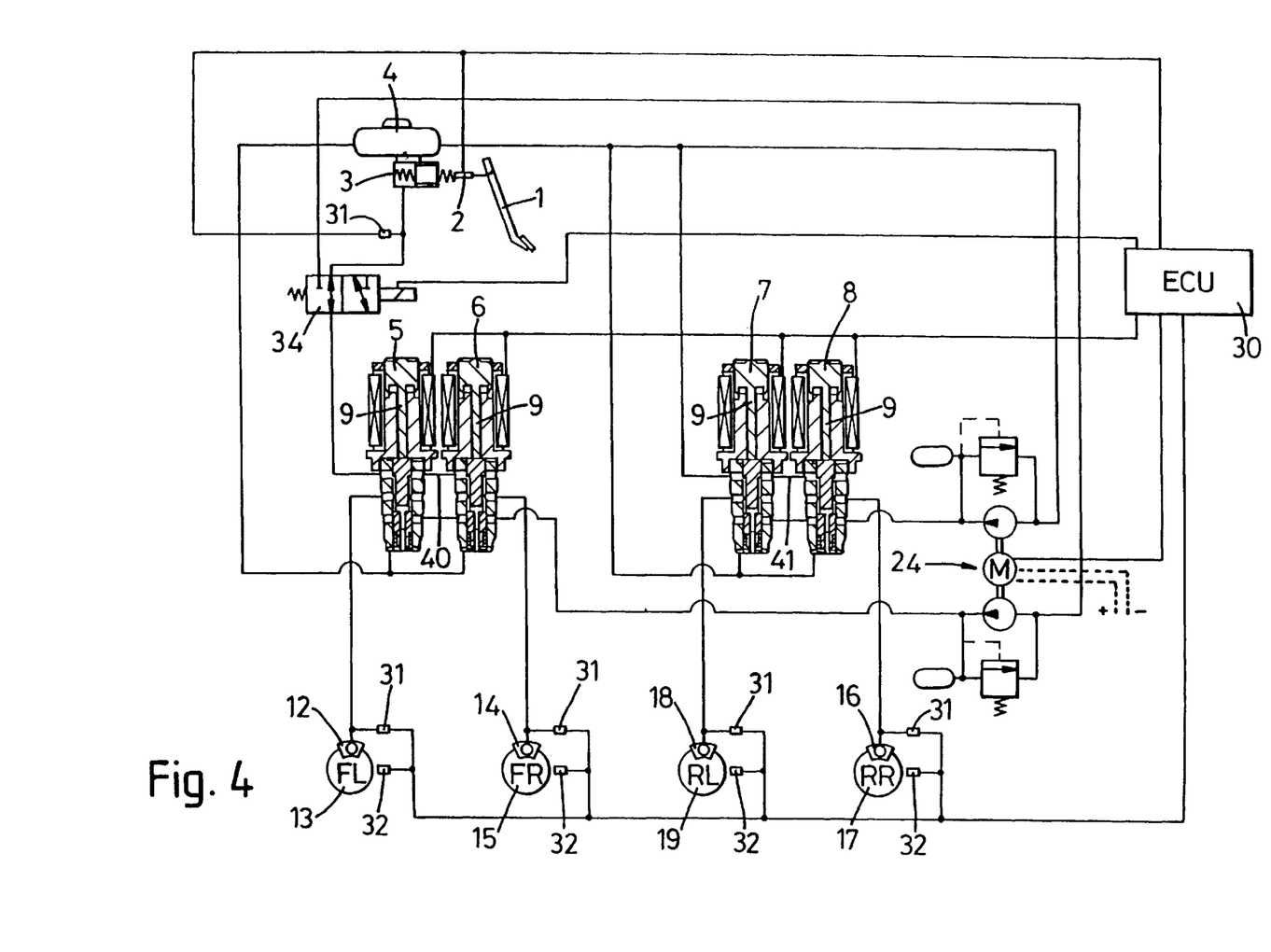
FIG. 4 is a layout of a braking system similar to FIG. 2 but showing front/rear split with push through with brakes on the front wheels.

The braking system shown in the layout of FIG. 4 is similar to FIG. 2 but shows a front/rear split with front push through, ABS and Traction Control is provided on each wheel.

In this system the hydraulic actuators 5 and 6 are connected in pairs with the actuator 6 controlling operation of the brake 12 on the front left side wheel 13, and the actuator 6 controlling the brake 14 on the front right wheel 15. The actuators 7 and 8 are also connected together with the actuator 7 controlling operation of the brake 18 on the rear left wheel 19, and the actuator 8 controlling operation of the brake 16 on the rear right wheel 17.

The second inlet ports 23 of the actuators 5 and 6 are connected to the master cylinder 3, and the second inlet ports 23 of the actuator 7 and 8 are connected to the reservoir 4. In consequence push through is available only to the brakes on the front wheels of the vehicle.

The construction and operation of the system of FIG. 4 is otherwise the same as that of FIG. 2 and corresponding reference numerals have been applied to corresponding parts.

Figure 5:
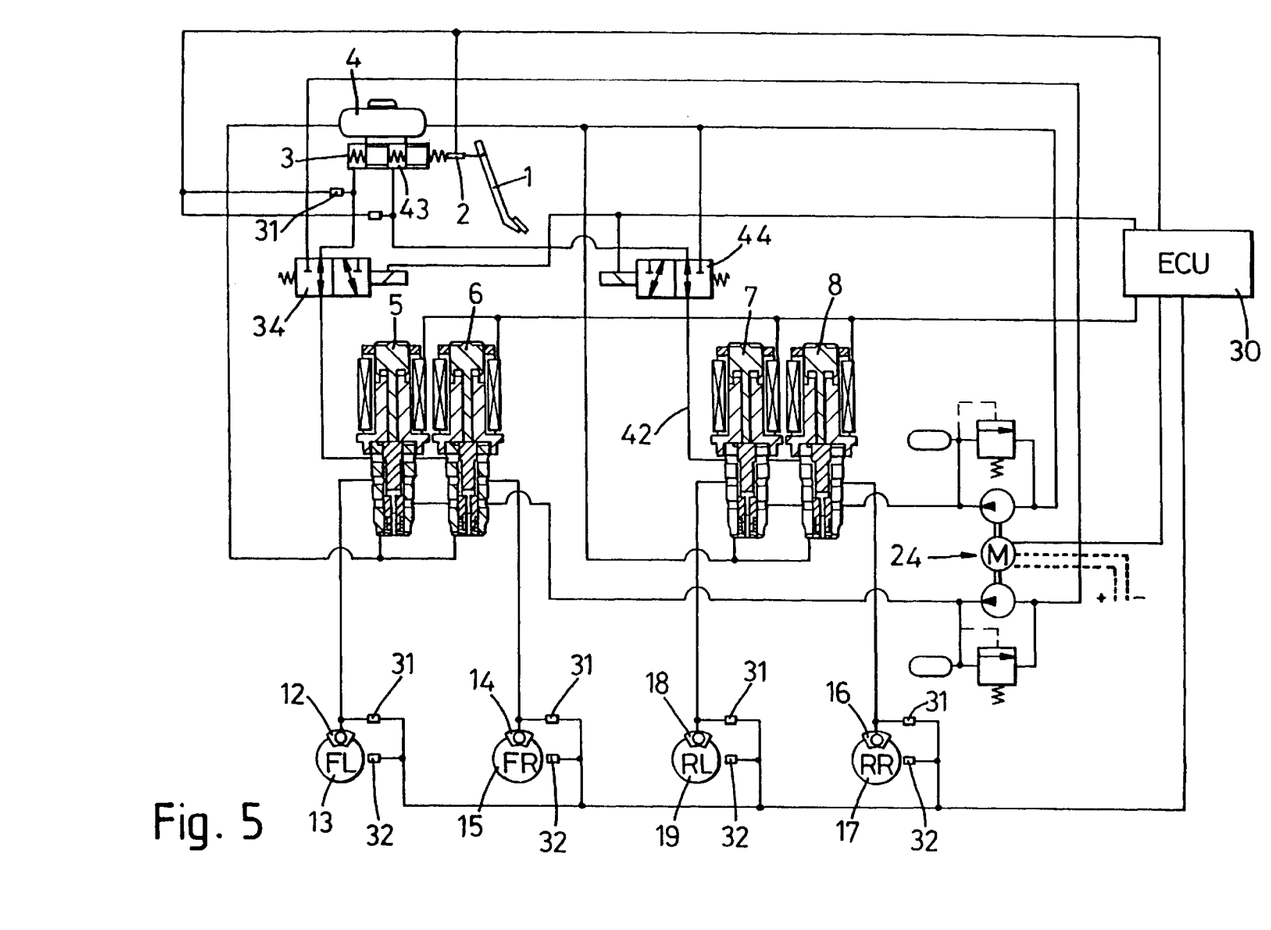
FIG. 5 is a layout of a braking system similar to FIG. 4 but with push through for all four brakes.

In the braking system illustrated in the layout of FIG. 5 of the accompanying drawings "push through" is available on each of the four brakes. This is achieved by modifying the system in order to replace the return line from the second inlet ports of the actuators 7 and 8 with a connection 42 to a second pressure space 43 of the master cylinder through a solenoid-operated valve 44 which, during ABS, is operable to remove fluid from the rear brakes 16 and 18 to the reservoir 4 in a similar manner to the operation of the solenoid operating valve 44.

The construction and operation of the braking system illustrated in the layout of FIG. 5 is otherwise the same as that of FIG. 4 and corresponding references have been applied to corresponding parts.

Figure 6:
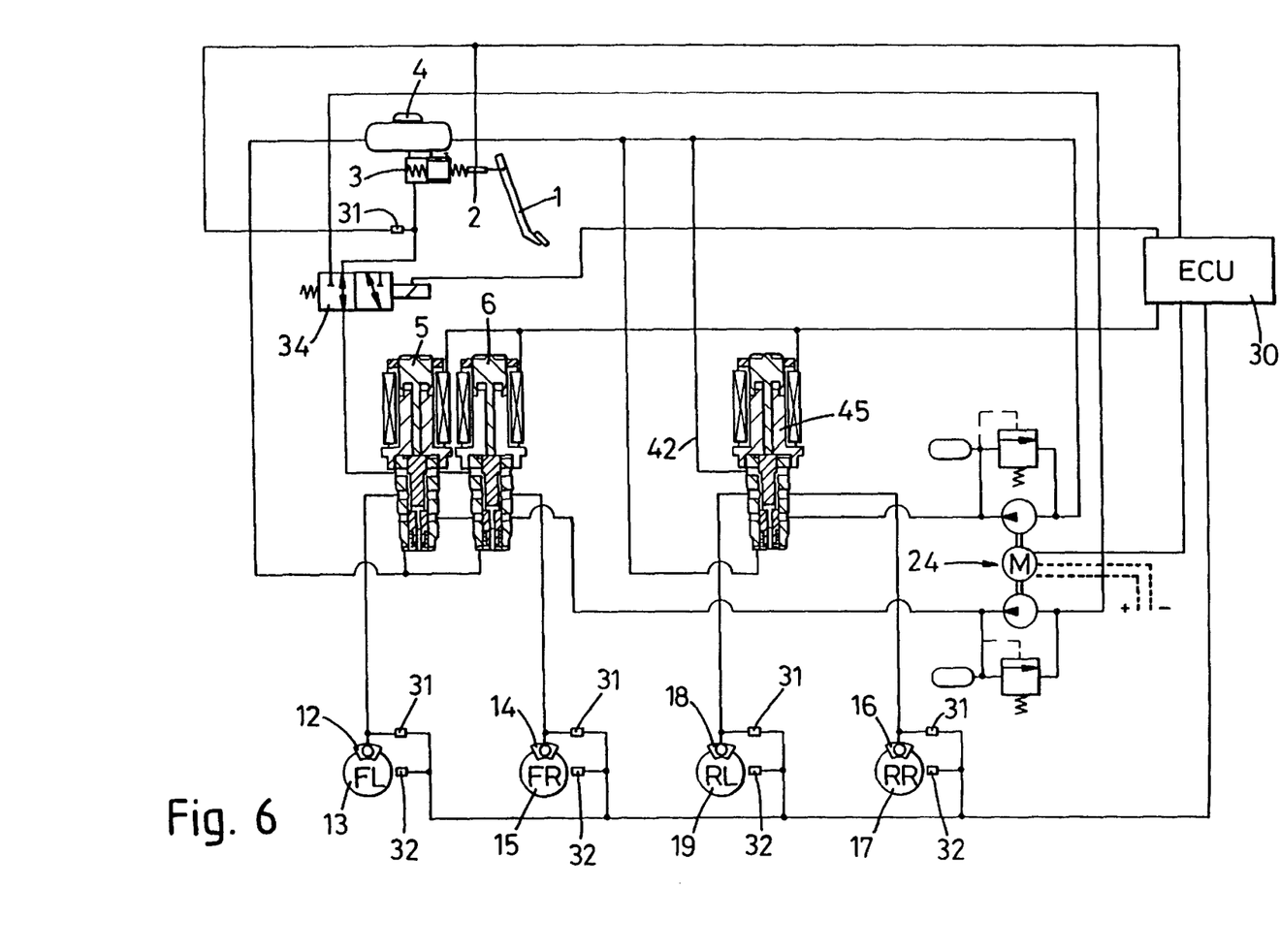
FIG. 6 is a layout of a braking system similar to FIG. 4 but showing a modification.

The braking system illustrated in the layout of FIG. 6 is similar to that of FIG. 4 except that a single solenoid-operated hydraulic actuator 45 has replaced the actuators 7 and 8 so that the single actuator controls operation of both rear wheel brakes 16 and 18 simultaneously.

As in the layout of FIG. 4 push through is only available for applying the brakes 12 and 14 on the front wheels.

What is claimed is:

1. A hydraulic braking system for vehicles comprising a brake pedal (1), means comprising a pedal responsive transducer (2) for producing an electrical sign responsive to a pedal movement, an electrically controlled circuit means comprising solenoid-operated hydraulic actuators (5, 6, 7, 8) for providing normal service braking in responsive to said transducer produced electrical signal, means comprising a master cylinder (3) for applying fluid under an operating pressure via a direct flow path to brakes (12, 14, 16, 18) and responsive to a push-through mode of operation during a period of a failure of the electrical controlled circuit means, a pressure sensor (31) responsive to an output of said master cylinder (3), and means for comparing said transducer produced electrical signal with a second electrical signal sent from said pressure sensor in order to check an integrity of at least said direct flow path from said master cylinder to said brakes.

2. A hydraulic braking system according to claim 1 further comprising means for normally disabling an output from the master cylinder (3) and for applying a hydraulic fluid from a high pressure source (27, 28) to said solenoid operated actuator (5, 6, 7 8) responsive to said transducer produced electrical, and means (2) for removing said disable and for enabling said direct flow path from said master cylinder to said brakes responsive to a failure of the electrical control circuit means.

3. An hydraulic braking system according to claim 2, characterised in that for normal service braking the operating fluid is supplied from the hydraulic source (27,28) to the brake.

4. An hydraulic braking system according to claim 2, characterised in that at least the brakes (12,14) on the front wheels (13,15) of the vehicle are adapted to be operated by a "push through" upon failure of the electronic control means.

5. A hydraulic braking system according to claim 2 wherein said pedal (1) has a continuous two part travel, means responsive to said pedal during a first part of said two part travel for causing fluid from the master cylinder to quick fill the brakes (17, 14, 16, 18) in order to provide a petal feel, and means responsive to said pedal during a second part of said two part travel for pressurizing said fluid in said brakes.

6. A hydraulic braking system of claim 2 and spring biased means for normally urging said hydraulic actuators (5, 6, 7, 8) into an open position, means responsive to each application of high fluid pressure under control of said electrically controlled circuit means for cycling said spring biased means, whereby upon failure of the electrical controlled circuit means said spring bias restores said actuator to an open position for establishing a free communication between said master cylinder and said brake in order to provide said direct flow path.

7. A hydraulic braking system as in claim 2 wherein said high pressure source comprises hydraulic pumps 27, 28, and means for providing a re-application of pressure in a braking mode selected from a group consisting of anti-blocking ABS control and a traction control.

8. The hydraulic braking system of claim 2 and means responsive to each operation of said pedal for operating said comparing means in order to check the integrity of said direct flow path.

9. A hydraulic braking system of claim 2 wherein said means for comparing said transducer produced electrical signal and said second electrical signal are included within said electrically controlled circuit means.

10. An hydraulic braking system according to claim 1 characterised in that the pedal responsive transducer (2) is adapted to monitor the displacement of the brake pedal (1) and the pressure sensor (31) is adapted to monitor the pressure in the direct flow path.

* * * * *